US010552710B2

(12) United States Patent
Helfman et al.

(10) Patent No.: US 10,552,710 B2
(45) Date of Patent: Feb. 4, 2020

(54) HIERARCHICAL SEQUENTIAL CLUSTERING

(75) Inventors: Jonathan Helfman, Half Moon Bay, CA (US); Joseph H. Goldberg, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 106 days.

(21) Appl. No.: 12/831,615

(22) Filed: Jul. 7, 2010

(65) Prior Publication Data

US 2011/0078144 A1 Mar. 31, 2011

Related U.S. Application Data

(60) Provisional application No. 61/247,301, filed on Sep. 30, 2009, provisional application No. 61/246,378, filed on Sep. 28, 2009.

(51) Int. Cl.
*G06K 9/62* (2006.01)

(52) U.S. Cl.
CPC ................. *G06K 9/6219* (2013.01)

(58) Field of Classification Search
CPC ........ G06F 17/18; G06F 19/22; G06K 9/6219
USPC .......................................................... 707/737
See application file for complete search history.

(56) References Cited

U.S. PATENT DOCUMENTS

| | | |
|---|---|---|
| 5,442,778 A | 8/1995 | Pedersen et al. |
| 5,986,673 A | 11/1999 | Martz |
| 6,023,659 A | 2/2000 | Seilhamer et al. |
| 6,380,937 B1 | 4/2002 | Dong et al. |
| 6,446,061 B1 | 9/2002 | Doerre et al. |
| 7,031,847 B1 | 4/2006 | Nozaki et al. |
| 7,062,502 B1 | 6/2006 | Kesler |
| 7,127,354 B1 | 10/2006 | Nozaki et al. |
| 7,315,785 B1 | 1/2008 | Nozaki et al. |
| 7,372,941 B2 | 5/2008 | Ivanisevic et al. |

(Continued)

OTHER PUBLICATIONS

Guralnik et al.,"A Scalable Algorithm for Clustering Sequential Data", 2001, IEEE.*

(Continued)

*Primary Examiner* — Neveen Abel Jalil
*Assistant Examiner* — Dawaune A Conyers
(74) *Attorney, Agent, or Firm* — Kilpatrick Townsend & Stockton LLP (57) ABSTRACT

Embodiments of the invention provide systems and methods for analyzing sequential data. Analyzing the sequential data can include grouping or clustering data that are similar in some way, e.g., similar ranges of quantities, similar categories, etc. More specifically, a method for hierarchical clustering of sequential data can comprise creating a dotplot of the sequential data. The dotplot can represent a plurality of sequences within the sequential data. A number of clusters represented by the plurality of sequences can be initialized, e.g., one cluster per sequence. A pair of sequences of the plurality of sequences having a longest sequential match can be identified, e.g., based on a line fitting technique, and merged into a single cluster. Identifying a pair of sequences of the plurality of sequences having a longest sequential match and merging the identified pair of sequences into a single cluster can be repeated until a single cluster remains.

18 Claims, 6 Drawing Sheets

(56) References Cited

U.S. PATENT DOCUMENTS

| | | |
|---|---|---|
| 7,401,094 B1 | 7/2008 | Kesler |
| 7,805,437 B1 | 9/2010 | Andersson et al. |
| 10,013,641 B2 | 7/2018 | Helfman et al. |
| 2002/0055840 A1 | 5/2002 | Yamada et al. |
| 2003/0110181 A1 | 6/2003 | Schuetze et al. |
| 2003/0211475 A1 | 11/2003 | Roberts |
| 2003/0228679 A1 | 12/2003 | Smith et al. |
| 2004/0002818 A1 | 1/2004 | Kulp et al. |
| 2004/0018506 A1 | 1/2004 | Koehler et al. |
| 2004/0103111 A1 | 5/2004 | Miller et al. |
| 2004/0126840 A1 | 7/2004 | Cheng et al. |
| 2004/0126940 A1 | 7/2004 | Inoue |
| 2004/0159783 A1 | 8/2004 | Gavin et al. |
| 2005/0026188 A1 | 2/2005 | Van Kessel et al. |
| 2005/0050033 A1 | 3/2005 | Thomas et al. |
| 2005/0108285 A1 | 5/2005 | Chickering et al. |
| 2005/0240563 A1 | 10/2005 | Domany et al. |
| 2005/0287544 A1 | 12/2005 | Bertucci et al. |
| 2006/0015265 A1 | 1/2006 | Raich |
| 2006/0028471 A1 | 2/2006 | Kincaid et al. |
| 2006/0088823 A1 | 4/2006 | Haab et al. |
| 2006/0184461 A1 | 8/2006 | Mori |
| 2007/0016095 A1 | 1/2007 | Low et al. |
| 2007/0105105 A1 | 5/2007 | Clelland et al. |
| 2007/0112755 A1 | 5/2007 | Thompson et al. |
| 2007/0192308 A1 | 8/2007 | Wei et al. |
| 2007/0212700 A1 | 9/2007 | Ranganathan et al. |
| 2008/0120051 A1 | 5/2008 | Ivanisevic et al. |
| 2008/0126523 A1 | 5/2008 | Tantrum et al. |
| 2008/0171323 A1 | 7/2008 | Banchereau et al. |
| 2008/0195322 A1 | 8/2008 | Altschuler et al. |
| 2008/0201397 A1 | 8/2008 | Peng et al. |
| 2008/0297513 A1 | 12/2008 | Greenhill et al. |
| 2009/0006002 A1 | 1/2009 | Honisch et al. |
| 2009/0203588 A1 | 8/2009 | Willman et al. |
| 2009/0215033 A1 | 8/2009 | Khan et al. |
| 2010/0011287 A1 | 1/2010 | Osaka |
| 2010/0011309 A1 | 1/2010 | Mitra et al. |
| 2010/0174732 A1 | 7/2010 | Levy et al. |
| 2010/0183205 A1 | 7/2010 | Pfleger et al. |
| 2010/0227802 A1 | 9/2010 | Tang et al. |
| 2010/0328492 A1 | 12/2010 | Fedorovskaya et al. |
| 2011/0004115 A1 | 1/2011 | Shahaf et al. |
| 2011/0074789 A1 | 3/2011 | Helfman et al. |
| 2011/0078194 A1 | 3/2011 | Helfman et al. |
| 2011/0293570 A1 | 12/2011 | McSpadden Gardener et al. |

OTHER PUBLICATIONS

Downs et al.,"Clustering Methods and Their Uses in Computational Chemistry", 2002.*
Nguyen et al.,"A Comparison of Line Extraction Algorithms using 2D Laser Rangefinder for Indoor Mobile Robotics", 2005.*
González et al., "Clustering exact matches of pairwise sequence alignments by weighted linear regression", 2008.*
Saha et al., "Computational Approaches and Tools Used in Identification of Dispersed Repetitive DNA Sequences", 2008.*
DNASTAR, "Getting Started with DNASTAR® Lasergene®", 2007 (Year: 2007).*
Alacam, O., et al., "A usability study of WebMaps witheye tracking tool: The effects of iconic representation of information." In HCII 2009, Spring-Verlag (2009), LNCS 5610, 12-21.
Aula, A., et al., "Eye-tracking Reveals the Personal Styles for Search Result Evaluation," in Proceedings of Human-Computer Interaction, Tampere Unit for Computer-Human Interaction (TAUCHI) 2005, pp. 135-138, [Can also be found in Proceedings of Interact 2005, Int. Fed. Info Proc., pp. 1058-1061.].
Bednarik, R., et al., "Temporal Eye-Tracking Data: Evolution of Debugging Strategies with Multiple Representations," in proceedings of 2008 Symposium on Eye Tracking Research & Applications, Savannah, Georgia, Mar. 26-28, 2008, pp. 99-102, ACM Press, Copyright 2008.

Beymer, D., et al., "WebGazeAnalyzer: A System for Capturing and Analyzing Web Reading Behavior Using Eye Gaze," in Proceedings of CHI 2005, Portland, Oregon, USA, Apr. 2-7, 2005, pp. 1913-1916, ACM Press, Copyright 2005.
Bojko, A., "Informative or Misleading? Heatmaps Deconstructed," J.A. Jacko (Ed.): Human-Computer Interaction, Part I, HCII 2009, LNCS 5610, 2009, pp. 30-39, Springer-Verlag Berlin Heidelberg.
Bojko, A., "Using Eye Tracking to Compare Web Page Designs: A Case Study," Journal of Usability Studies, May 2006, pp. 112-120, Issue 3, vol. 1.
Church, K., et al., "Dotplot: a Program for Exploring Self-Similarity in Millions of Lines of Text and Code," The Journal of Computational and Graphical Statistics, 1993, 12 pages (pp. 153-174 in publication), vol. 2, No. 2.
Cinar, M., "Eye Tracking Method to Compare the Usability of University Web Sites: A Case Study," M. Kurosu (Ed.): Human Centered Design, HCII 2009, LNCS 5619, 2009, pp. 671-678, Springer-Verlag Berlin Heidelberg.
Cutrell, E., et al., "What Are You Looking for? An Eye-tracking Study of Information Usage in Web Search," in Proceedings of CHI 2007, San Jose, California, USA, Apr. 28-May 3, 2007, 10 pages (pp. 407-416 in publication), ACM, Copyright 2007.
Feusner, M., et al., "Testing for Statistically Significant Differences Between Groups of Scan Patterns," in Proceedings of 2008 Symposium on Eye Tracking Research & Applications, Savannah, Georgia, Mar. 26-28, 2008, pp. 43-46, ACM Press, Copyright 2008.
Goldberg, J. H., et al., "Computer Interface Evaluation Using Eye Movements: Methods and Constructs," International Journal of Industrial Ergonomics, 1999, pp. 631-645, vol. 24.
Goldberg, J. H., et al., "Eye Movement-Based Evaluation of the Computer Interface," Advances in Occupational Ergonomics and Safety, S. Kumar, (Ed.), 1998, pp. 529-532, IOS Press.
Goldberg, J. H., et al., "Eye Tracking in Web Search Tasks: Design Implications," in Proceedings of 2002 Symposium on Eye Tracking Research & Applications, ACM Press, 2002, 8 pages.
Granka, L., et al., "Location Location Location: Viewing Patterns on WWW Pages," in Proceedings of the 2006 Symposium on Eye Tracking Research & Applications, San Diego, California, Mar. 27-29, 2006, p. 43, ACM Press, Copyright 2006.
Guan, Z., et al., "An Eye Tracking Study of the Effect of Target Rank on Web Search," in Proceedings of CHI 2007, San Jose, California, USA, Apr. 28-May 3, 2007, 4 pages (pp. 417-420 in publication), ACM Press, Copyright 2007.
Habuchi, Y., et al., "Comparison of Eye Movements in Searching for Easy-to-Find and Hard-to-Find Information in a Hierarchically Organized Information Structure," in Proceedings of the 2008 Symposium on Eye Tracking Research & Applications, Savannah, Georgia, Mar. 26-28, 2008, pp. 131-134, ACM Press, Copyright 2008.
Helfman, J. I., "Similarity Patterns in Language," Proceedings of the IEEE Symposium on Visual Language, 1994, 3 pages (pp. 173-175 in publication), IEEE Press.
Hembrooke, H., et al., "Averaging Scan Patterns and What They Can Tell Us," in Proceedings of the 2006 symposium on Eye Tracking Research & Applications, San Diego, California, Mar. 27-29, 2006, p. 41, ACM Press, Copyright 2006.
Huang, Y., et al., "Rapid and Sensitive Dot-matrix Methods for Genome Analysis," Bioinformatics Advance Access, Jan. 22, 2004, pp. 460-466, vol. 20, No. 4, Oxford University Press, Copyright 2004, downloaded on Mar. 15, 2010 from URL: http://bioinformatics.oxfordjournals.org.
Josephson, S., et al., "Visual Attention to Repeated Internet Images: Testing the Scanpath Theory on the World Wide Web," in Proceedings of the 2002 Symposium on Eye Tracking Research & Applications, New Orleans, Louisiana, USA, pp. 43-49, ACM Press, Copyright 2002.
Levenshtein, V. I., "Binary Codes Capable of Correcting Deletions, Insertions, and Reversals," Cybernetics and Control Theory, Doklady Physics, Feb. 1966, pp. 707-710, vol. 10, No. 8.
Mankowski, W. C., et al., "Finding Canonical Behaviors in User Protocols," in Proceedings of CHI 2009, Boston, MA, USA, Apr. 4-9, 2009, 4 pages, ACM Press, Copyright 2009.

(56) References Cited

OTHER PUBLICATIONS

Matsuda, Y., et al., "An Analysis of Eye Movements During Browsing Multiple Search Results Pages," J.A. Jacko (Ed.): Human-Computer Interaction, Part I, HCII, LNCS 5610, pp. 121-130, Copyright 2009 Springer-Verlag Berlin Heidelberg, Copyright 2009.
Myers, C. W., "Toward a Method of Objectively Determining Scanpath Similarity," [Abstract], Journal of Vision, Sep. 23, 2005, 2 pages, vol. 5, No. 8, Abstract 693, downloaded on Jan. 5, 2010 from URL: http://www.journalof vision.org/5/8/693/.
Najemnik, J., et al., "Optimal Eye Movement Strategies in Visual Search," Nature, Mar. 17, 2005, pp. 387-391, vol. 434, Copyright 2005 Nature Publishing Group.
Salvucci, D. D., et al., "Identifying Fixations and Saccades in Eye-Tracking Protocols," in Proceedings of the 2000 Symposium on Eye Tracking Research & Applications, Palm Beach Gardens, FL, USA, pp. 71-78, ACM Press, Copyright 2000.
Santella, A., et al., "Robust Clustering of Eye Movement Recordings for Quantification of Visual Interest," in Proceedings of the 2004 Symposium on Eye Tracking Research & Applications, San Antonio, Texas, 2004, pp. 27-34, ACM Press, Copyright 2004.
Smith, T. F., et al., "Identification of Common Molecular Subsequences," Reprinted from Journal of Molecular Biology, 1981, pp. 195-197, vol. 147, Academic Press, Copyright 1980.
Tufte, E. R., "Beautiful Evidence," Sparklines: Intense Word-Sized Graphics, Graphic Press LLC, Cheshire, CT., pp. 46-63, Copyright 2006.
Tufte, E. R., "The Visual Display of Quantitative Information," Theory of Data Graphics, Graphic Press LLC, Cheshire, CT., pp. 170-175, Copyright 1983.
Wattenberg, M., "Arc Diagrams: Visualizing Structure in Strings," in Proceedings of the IEEE Symposium on Information Visualization (InfoVis'02), 2002, 8 pages, IEEE Computer Society.
Werman, M., et al., "A Bayesian Method for Fitting Parametric and Nonparametric Models to Noisy Data," IEEE Transactions on Pattern Analysis and Machine Intelligence, May 2001, pp. 528-534, vol. 23, No. 5, Copyright 2001.
West, J. M., et al., "EyePatterns: Software for Identifying Patterns and Similarities Across Fixation Sequences," in Proceedings of the 2006 Symposium on Eye Research Tracking & Applications, San Diego, California, Mar. 27-29, 2006, pp. 149-154, ACM Press, Copyright 2006.
Wooding, D. S., "Eye Movements of Large Populations: II. Deriving Regions of Interest, Coverage, and Similarity Using Fixation Maps," Behavior Research Methods, Instruments, & Computers, 2002, pp. 518-528, vol. 34, No. 4, Psychonomic Society, Inc., Copyright 2002.
Cormode, G., et al., "Radial Histograms for Spatial Streams—DIMACS Technical Report Nov. 2003," Rutgers University, 2003, 25 pages.
Delling, D., et al., "Engineering Time-Expanded Graphs for Faster Timetable Information," Internationales Begegnungs- und Forschungszentrum für Informatik (IBFI), Schloss Dagstuhl, Germany, Sep. 2008, 21 pages.
Seo, J., et al., Interactively Exploring Hierarchical Clustering Results, Computer, Jul. 2002, vol. 35, Iss. 7, pp. 80-86.
U.S. Appl. No. 12/831,623, filed Jul. 7, 2010, Office Action dated Jun. 19, 2012, 21 pages.
U.S. Appl. No. 12/831,623, Final Office Action dated Feb. 27, 2014, 33 pages.
U.S. Appl. No. 12/831,623, Advisory Action dated Sep. 24, 2013, 6 pages.
Ding et al., Cluster Aggregate Inequality and Multi-Level Hierarchical Clustering, Lecture Notes in Computer Science, 2005, 12 pages, No. 3721.
U.S. Appl. No. 12/831,623, filed Jul. 7, 2010, Final Office Action dated Nov. 23, 2012, 25 pages.
U.S. Appl. No. 12/831,641, filed Jul. 7, 2010, Office Action dated Aug. 31, 2012, 13 pages.
Ma, Patrick CH, Keith CC Chan, and David KY Chiu. "Clustering and re-clustering for pattern discovery in gene expression data." Journal of bioinformatics and computational biology 3.02 (2005): 281-301.
Yu, T., et al., "Argo Comparative View," Broad Institute, Sep. 2006, [retrieved on Aug. 24, 2012], 5 pages. Retrieved from: http:www.broadinstitute.org/annotation/argo/help/usecase_comparative/.
U.S. Appl. No. 12/831,623, Non-Final Office Action dated Nov. 6, 2013, 30 pages.
Parkin et al., Identifying structural motifs in inter-molecular contacts using cluster analysis Part 1. Interactions of carboxylic acids with primary amides and with other carboxylic acid groups, CrystEngComm, vol. 8, issue 3, Mar. 1, 2006, pp. 257-264.
Eisen, Michael B., et al. "Cluster analysis and display of genome-wide expression patterns." Proceedings of the National Academy of Sciences 95.25 (1998): 14863-14868.
Mabrouk et al., "BIOINFTool: Bioinformatics and sequence data analysis in molecular biology using Matlab", 2006.
U.S. Appl. No. 12/831,623, filed Jul. 7, 2010, Non-Final Office Action dated Mar. 1, 2013, 20 pages.
U.S. Appl. No. 12/831,623, filed Jul. 7, 2010, Final Office Action dated Jul. 15, 2013, 25 pages.
U.S. Appl. No. 12/831,641, filed Jul. 7, 2010, Final Office Action dated Feb. 19, 2013, 16 pages.
U.S. Appl. No. 12/831,641, filed Jul. 7, 2010, Advisory Action dated May 1, 2013, 5 pages.
U.S. Appl. No. 12/831,623, Non-Final Office Action dated Jun. 19, 2014, 33 pages.
U.S. Appl. No. 12/831,641, Non-Final Office Action dated Jun. 11, 2014, 19 pages.
U.S. Appl. No. 12/831,623, Final Offtce Action dated Oct. 23, 2014, 39 pages.
U.S. Appl. No. 12/831,641, Final Office Action dated Nov. 28, 2014, 14 pages.
U.S. Appl. No. 12/831,623, Non-Final Office Action dated Apr. 9, 2015, 35 pages.
U.S. Appl. No. 12/831,641, Non-Final Office Action dated May 8, 2015, 16 pages.
U.S. Appl. No. 12/831,623, Corrected Notice of Allowance dated Feb. 8, 2018, 5 pages.
U.S. Appl. No. 12/831,623, Final Office Action dated Sep. 16, 2015, 40 pages.
U.S. Appl. No. 12/831,623, Final Office Action dated Jun. 16, 2016, 50 pages.
U.S. Appl. No. 12/831,623, Non-Final Office Action dated Jan. 4, 2016, 50 pages.
U.S. Appl. No. 12/831,623, Notice of Allowance dated Jan. 18, 2018, 24 pages.
U.S. Appl. No. 12/831,641, Advisory Action dated Feb. 5, 2015, 3 pages.
U.S. Appl. No. 12/831,641, Final Office Action dated Oct. 16, 2015, 21 pages.

* cited by examiner

HIERARCHICAL SEQUENTIAL CLUSTERING

CROSS-REFERENCES TO RELATED APPLICATIONS

The present application claims benefit under 35 USC 119(e) of U.S. Provisional Application No. 61/246,378, filed on Sep. 28, 2009 by Helfman et al. and entitled "Hierarchical Sequential Clustering," and U.S. Provisional Application No. 61/247,301, filed on Sep. 30, 2009 by Helfman et al. and entitled "Hierarchical Sequential Clustering," both of which are incorporated herein by reference for all purposes. The present application is also related to U.S. patent application Ser. No. 12/615,749, filed on Nov. 10, 2009 by Helfman et al. and entitled "Using Dotplots for Comparing and Finding Patterns in Sequences of Data Points" which is also incorporated herein by reference in its entirety for all purposes.

BACKGROUND

Embodiments of the present invention relate to analyzing sequential data, and more specifically to hierarchically clustering sequential data.

Sequential data, i.e., a dataset including sequential information, can represent a variety of different types of data. For example, such a dataset can include records of product purchases after other purchases, records of web page requests after other page requests, records of regions of a document or application viewed after other regions are viewed, etc. The sequence can represent a path, i.e., a sequence of two or more positions connected in a particular order. Clustering of such sequential data can be useful in analysis of such data to, for example, help identify and/or understand higher-level patterns.

Analysis of paths is performed in various different fields or domains. For example, in eye tracking analysis, scanpaths representing users' eye movements while viewing a scene may be analyzed to determine high-level scanning strategies. The scanning strategies determined from such an analysis may be used to improve product designs. For example, by studying scanpaths for users viewing a web page, common viewing trends may be determined and used to improve the web page layout. Various other types of analyses on paths may be performed in other fields. Accordingly, new and improved techniques are always desirable for analyzing sequential information that can provide insight into characteristics of the sequences that facilitate comparisons of sequences of data.

BRIEF SUMMARY

Embodiments of the invention provide systems and methods for analyzing sequential data. The sequential data can comprise a sequence of data points arranged in a particular order. Analyzing the sequential data can include grouping or clustering data that are similar in some way, e.g., similar ranges of quantities, similar categories, etc. More specifically, a method for hierarchical clustering of sequential data can comprise identifying pair-wise sequential matches between the plurality of sequences within the sequential data. A number of clusters represented by the plurality of sequences can be initialized. For example, initializing the number of clusters can comprise initializing the number of clusters to one cluster per sequence in the sequential data. A pair of sequences of the plurality of sequences having a longest sequential match can be identified. Identifying the pair of sequences of the plurality of sequences having a longest sequential match can be based on a line fitting technique such as a regression technique, e.g., a least-square regression.

The identified pair of sequences of the plurality of sequences having the longest sequential match can be merged into a single cluster. Merging the identified pair of sequences into a single cluster can comprise assigning a unique identifier to the single cluster, copying a closest distance to the single cluster, assigning a reference to the matching sequence in a dotplot matches array (if any), and assigning a reference to a sequence to the single cluster. The assigned sequence can be the child sequence that matches the most other sequences in the data. Identifying a pair of sequences of the plurality of sequences having a longest sequential match and merging the identified pair of sequences into a single cluster can be repeated until a single cluster remains.

According to another embodiment, a system can comprise a processor and a memory communicatively coupled with and readable by the processor. The memory can have stored therein a series of instructions which, when executed by the processor, cause the processor to hierarchically cluster sequential data by identifying pair-wise sequential matches between the plurality of sequences within the sequential data. A number of clusters represented by the plurality of sequences can be initialized. For example, initializing the number of clusters can comprise initializing the number of clusters to one cluster per sequence in the sequential data. A pair of sequences of the plurality of sequences having a longest sequential match can be identified. Identifying the pair of sequences of the plurality of sequences having a longest sequential match can be based on a line fitting technique or other test of co-linearity, such as a regression technique, e.g., a least-square regression.

The identified pair of sequences of the plurality of sequences having the longest sequential match can be merged into a single cluster. Merging the identified pair of sequences into a single cluster can comprise assigning a unique id to the single cluster, copying a closest distance to the single cluster, assigning a reference to the matching sequence in a dotplot matches array (if any), and assigning a reference to a sequence to the single cluster. The assigned sequence can be the child sequence that matches the most other sequences in the data. Identifying a pair of sequences of the plurality of sequences having a longest sequential match and merging the identified pair of sequences into a single cluster can be repeated until a single cluster remains.

According to yet another embodiment, a machine-readable medium can have stored therein a series of instructions which, when executed by a processor, cause the processor to hierarchically cluster sequential data by identifying pair-wise sequential matches between the plurality of sequences within the sequential data. A number of clusters represented by the plurality of sequences can be initialized. For example, initializing the number of clusters can comprise initializing the number of clusters to one cluster per sequence in the sequential data. A pair of sequences of the plurality of sequences having a longest sequential match can be identified. Identifying the pair of sequences of the plurality of sequences having a longest sequential match can be based on a line fitting technique such as a regression technique, e.g., a least-square regression.

The identified pair of sequences of the plurality of sequences having the longest sequential match can be merged into a single cluster. Merging the identified pair of sequences into a single cluster can comprise assigning a unique id to the single cluster, copying a closest distance to the single cluster, assigning a reference to the matching sequence in a dotplot matches array (if any), and assigning a reference to a sequence to the single cluster. The assigned sequence can be the child sequence that matches the most other sequences in a dotplot Identifying a pair of sequences of the plurality of sequences having a longest sequential match and merging the identified pair of sequences into a single cluster can be repeated until a single cluster remains.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for grouping or clustering data. More specifically, embodiments of the present invention provide for hierarchically clustering sequential data. Large amounts of data can be organized and understood by grouping or clustering data that are similar in some way, e.g., similar ranges of quantities, similar categories, etc. Hierarchical sequential clustering refers to hierarchical clustering of sequential data, i.e., a dataset including sequential information. Hierarchical clustering can be defined as a form of binary clustering in which each sub-cluster has two constituents, either an unclustered data value (i.e., a leaf) or another binary cluster. According to one embodiment, hierarchical clustering can be accomplished by merging the "closest" or most similar data values into a binary cluster, storing an aggregate value in the new cluster, and repeating the process until all of the data are merged into a single cluster.

A sequence may be any list of tokens or symbols in a particular order. Examples of sequences can include but are not limited to words in a query, words in a document, symbols in a computer program's source code, scanpaths, i.e., sequences of eye tracking fixation points as determined by an eye tracking system, sequences of requested URLs in a user's web browsing session, sequences of requested URLs in a web server's log file, etc.

As the term is used herein, a path may be defined as a sequence of two or more positions (a.k.a. "points"). The first point in the sequence of points may be referred to as the start point of the path and the last point in the sequence may be referred to as the end point of the path. The portion of a path between any two consecutive points in the sequence of points may be referred to as a path segment. A path may comprise one or more segments.

Thus, there are different types of paths considered to be within the scope of the term as used herein. Examples described below have been described with reference to a specific type of path, referred to as a scanpath, which is used to track eye movements. A scanpath is a path that an eye follows when viewing a scene. A scanpath is defined by a sequence of fixation points (or gaze locations). A path segment between two consecutive fixation points in the sequence of fixation points is referred to as a saccade, or rapid eye movement. A scanpath is thus a sequence of fixation points connected by saccades during scene viewing where the saccades represent eye movements between fixation points. For purposes of simplicity, the scanpaths described below are 1- or 2-dimensional paths. The teachings of the present invention may however also be applied to paths in multiple dimensions.

However, it should be understood that, while embodiments of the present invention have been described in context of scanpaths, this is not intended to limit the scope of the present invention as recited in the claims to scanpaths. Teachings of the present invention may also be applied to other types of paths or sequences occurring in various different domains such as a stock price graph, a path followed by a car between a start and an end destination, and the like. Various additional details of embodiments of the present invention will be described below with reference to the figures.

Figure 1:
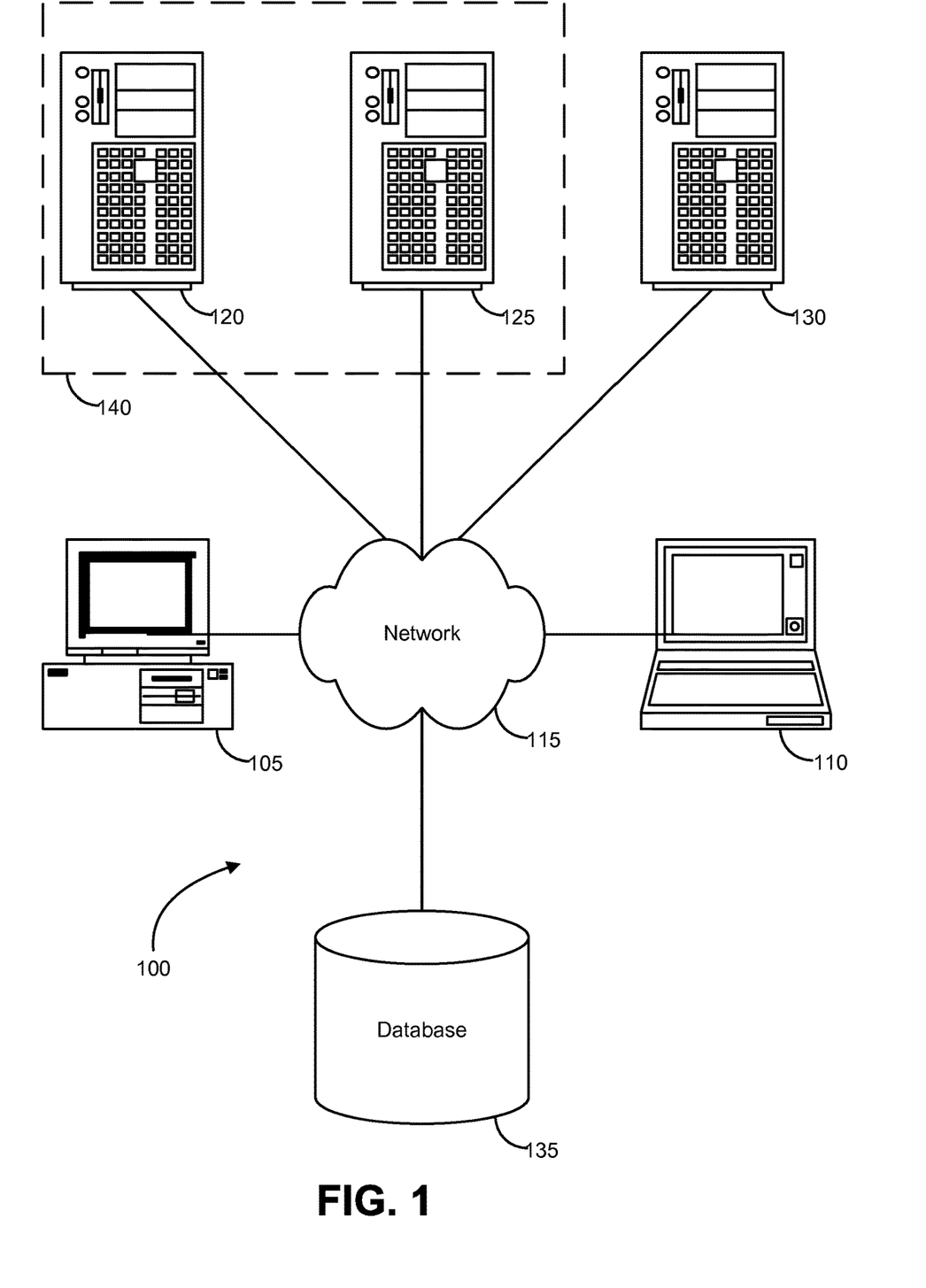
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
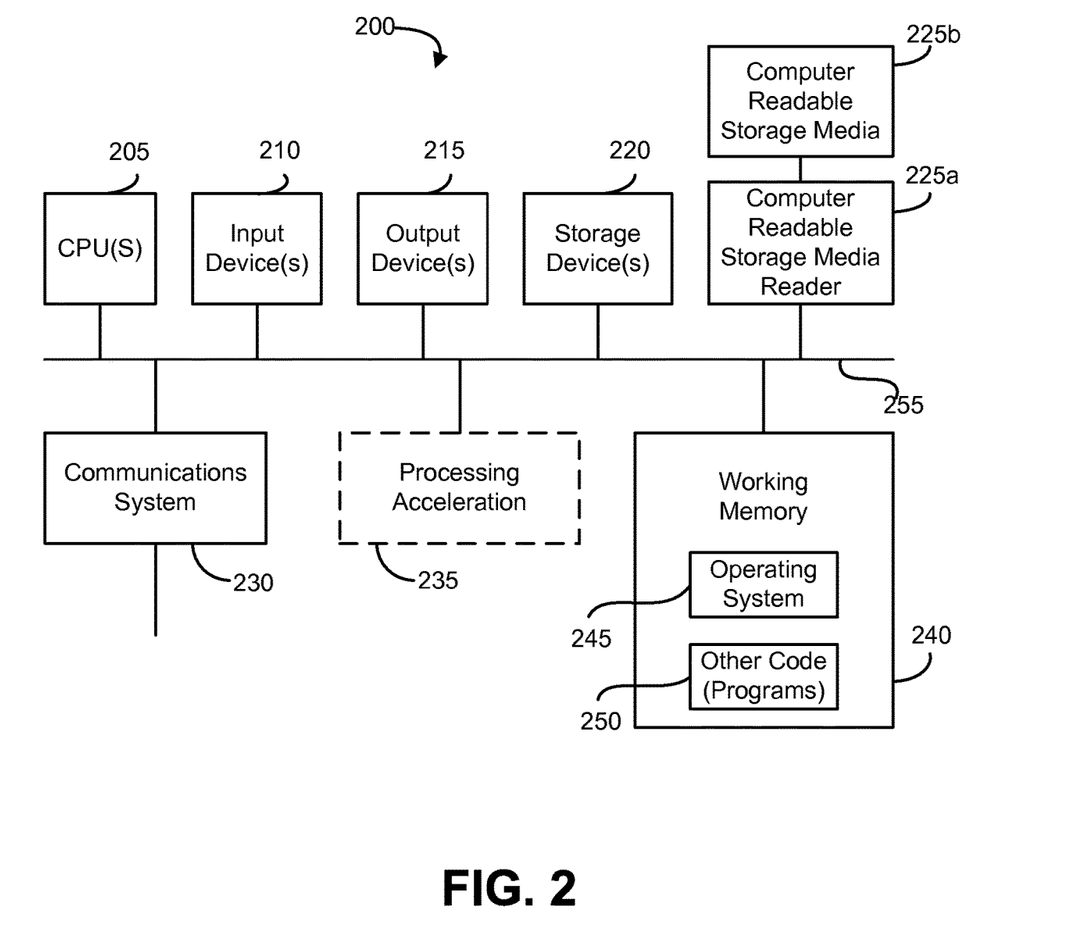
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention provide for hierarchically clustering sequential data including but not limited to paths such as eye tracking data including scanpaths representing users' eye movements while viewing a stimulus image or other scene. The eye tracking data can represent a number of different scanpaths and can be analyzed, for example, to find patterns or commonality between the scanpaths. According to one embodiment, analyzing eye tracking data with a path analysis system such as the computer system 200 described above can comprise receiving the eye tracking data at the path analysis system. The eye tracking data, which can be obtained by the system in a number of different ways as will be described below, can include a plurality of scanpaths, each scanpath representing a sequence of regions of interest on a scene such as a stimulus image displayed by the system. A dotplot can be generated by the system that represents matches between each of the plurality of scanpaths. Hierarchical clustering can be performed based on the dotplot by merging the "closest" or most similar data values into a binary cluster, storing an aggregate value in the new cluster, and repeating the process until all of the data are merged into a single cluster. Additional details of such a process are described below with reference to FIG. 6.

Figure 3:
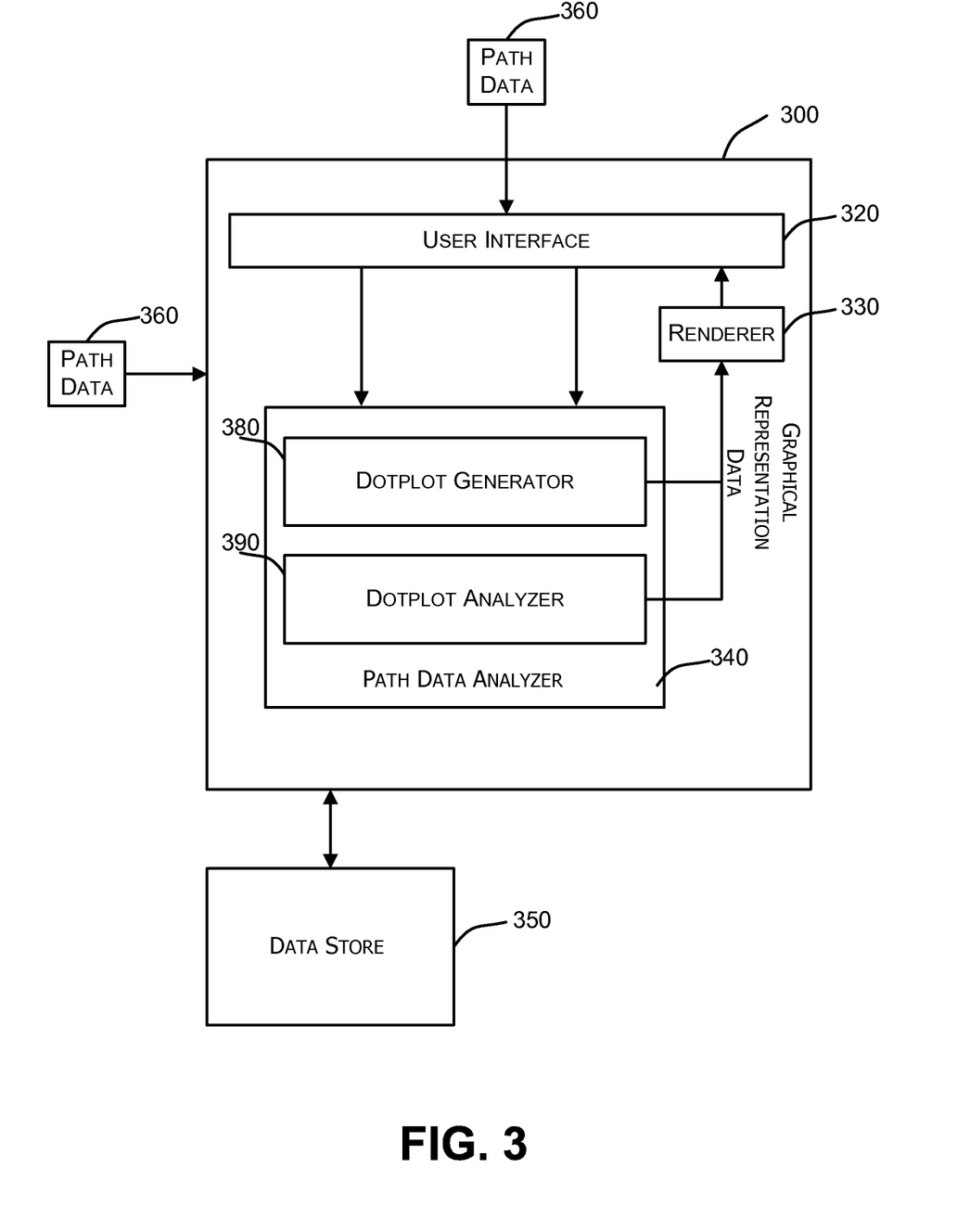
FIG. 3 is a block diagram illustrating, at a high-level, functional components of an exemplary system for analyzing eye tracking data in which embodiment of the present invention may be implemented.

FIG. 3 is a block diagram illustrating, at a high-level, functional components of an exemplary system for analyzing eye tracking data in which embodiments of the present invention may be implemented. In this example, the path analysis system 300 comprises several components including a user interface 320, a renderer 330, and a path data analyzer 340. The various components may be implemented in hardware, or software (e.g., code, instructions, program executed by a processor), or combinations thereof. Path analysis system 300 may be coupled to a data store 350 that is configured to store data related to processing performed by system 300. For example, path data (e.g., scanpath data) may be stored in data store 350.

User interface 320 provides an interface for receiving information from a user of path analysis system 300 and for outputting information from path analysis system 300. For example, a user of path analysis system 300 may enter path data 360 for a path to be analyzed via user interface 320. Additionally or alternatively, a user of path analysis system 300 may enter commands or instructions via user interface 320 to cause path analysis system 300 to obtain or receive path data 360 from another source. It should be noted, however, that a user interface is entirely optional to the present invention, which does not rely on the existence of a user interface in any way.

System 300 may additionally or alternatively receive path data 360 from various other sources. In one embodiment, the path data may be received from sources such as from an eye tracker device. For example, information regarding the fixation points and saccadic eye movements between the fixation points, i.e., path data 360, may be gathered using eye tracking devices such as devices provided by Tobii (e.g., Tobii T60 eye tracker). An eye-tracking device such as the Tobii T60 eye tracker is capable of capturing information related to the saccadic eye activity including location of fixation points, fixation durations, and other data related to a scene or stimulus image, such as a webpage for example, while the user views the scene. Such an exemplary user interface is described in greater detail below with reference to FIG. 4 The Tobii T60 uses infrared light sources and cameras to gather information about the user's eye movements while viewing a scene.

The path data may be received in various formats, for example, depending upon the source of the data. In one embodiment and regardless of its exact source and/or format, path data 360 received by system 300 may be stored in data store 350 for further processing.

Path data 360 received by system 300 from any or all of these sources can comprise data related to a path or plurality of paths to be analyzed by system 300. Path data 360 for a path may comprise information identifying a sequence of points included in the path, and possibly other path related information. For example, for a scanpath, path data 360 may comprise information related to a sequence of fixation points defining the scanpath. Path data 360 may optionally include other information related to a scanpath such as the duration of each fixation point, inter-fixation angles, inter-fixation distances, etc. Additional details of exemplary scanpaths as they relate to an exemplary stimulus image are described below with reference to FIG. 4.

Path data analyzer 340 can be configured to process path data 360 and, for example, identify patterns within the path data. For example, path data analyzer 340 can receive a set of path data 360 representing multiple scanpaths and can analyze these scanpaths to identify patterns, i.e., similar or matching portions therein. According to one embodiment, the path data analyzer can include a dotplot generator 380 and dotplot analyzer 390. Dotplot generator 380 can be adapted to generate a dotplot such as illustrated in and describe below with reference to FIG. 5. Such a dotplot can accept as input, or be generated based on sequences related to each scanpath of the path data. Dotplot analyzer 390 can then, based on the dotplot, identify patterns within the scanpaths. For example, dotplot analyzer 390 can perform hierarchical clustering based on the dotplot by merging the "closest" or most similar data values into a binary cluster, storing an aggregate value in the new cluster, and repeating the process until all of the data are merged into a single cluster as described in greater detail below with reference to FIG. 6.

Path analysis system 300 can also include renderer 330. Renderer 330 can be configured to receive the dotplot generated by dotplot generator 380 and/or an output of dotplot analyzer 390 and provide, e.g., via user interface 320, a display or other representation of the results. For example, renderer 330 may provide a graphical representation of the dotplot including an indication, e.g., highlighting, shading, coloring, etc. indicating portions containing matches or identified patterns. It should be noted that a renderer 330 is not required and may not be included in some implementations since the dotplot may be considered intermediate representation that may be stored in memory and not rendered to the screen.

As noted above, the path data 360, i.e., information regarding the fixation points and saccadic eye movements between the fixation points, may be gathered using eye tracking devices such as devices capable of capturing information related to the saccadic eye activity including location of fixation points, fixation durations, and other data related to a scene or stimulus image while the user views the scene or image. Such a stimulus image can comprise, for example, a webpage or other user interface which, based on analysis of various scanpaths may be evaluated for possible improvements to the format or layout thereof.

Figure 4:
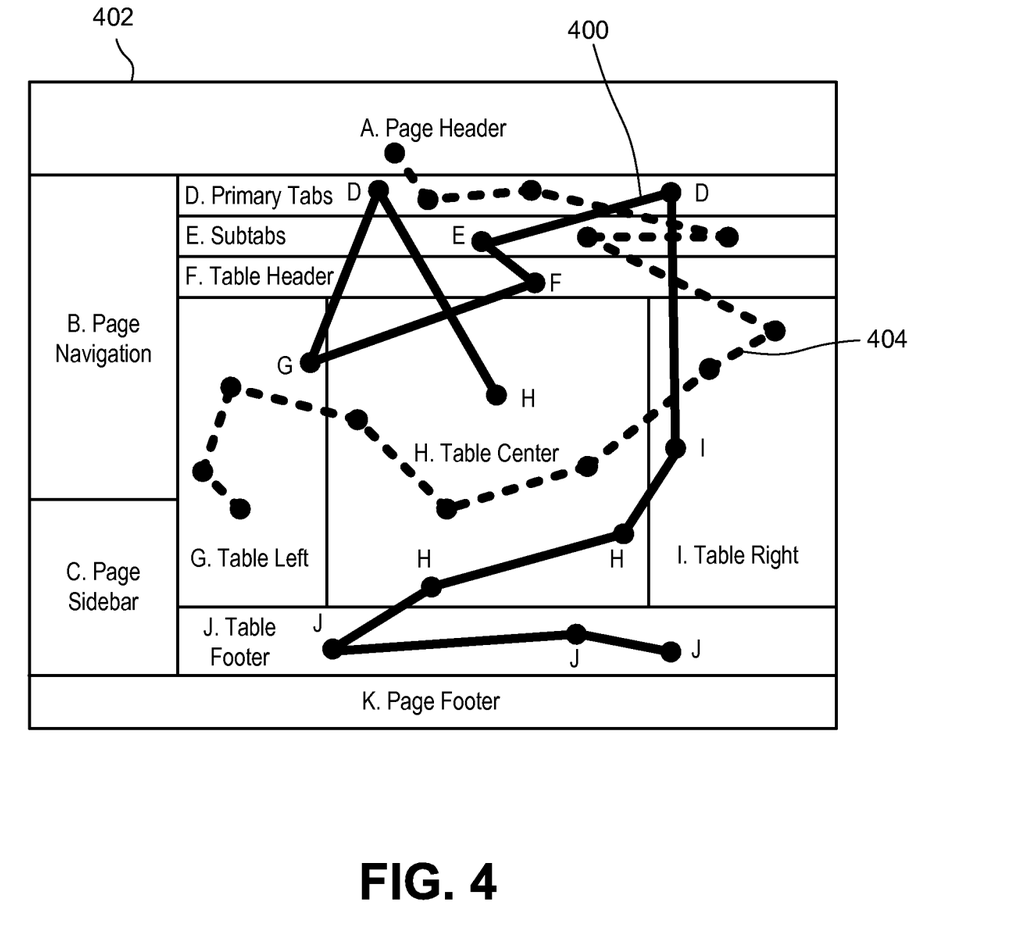
FIG. 4 illustrates an exemplary stimulus image of a user interface which may be used with embodiments of the present invention and a number of exemplary scanpaths.

FIG. 4 illustrates an exemplary stimulus image of a user interface which may be used with embodiments of the present invention and a number of exemplary scanpaths. It should be noted that this stimulus image and user interface are provided for illustrative purposes only and are not intended to limit the scope of the present invention. Rather, any number of a variety of different stimulus images, user interfaces, or means and/or methods of obtaining a query sequence are contemplated and considered to be within the scope of the present invention.

In this example, the image, which can comprise for example a web page 402 or other user interface of a software application, includes a number of elements which each, or some of which, can be considered a particular region of interest. For example, webpage 402 may be considered to comprise multiple regions such as: A (page header), B (page navigation area), C (page sidebar), D (primary tabs area), E (subtabs area), F (table header), G (table left), H (table center), I (table right), J (table footer), and K (page footer). Webpage 402 may be displayed on an output device such as a monitor and viewed by the user.

FIG. 4 also depicts exemplary scanpaths 400 and 404 representing eye movements of one or more users while viewing the webpage 402 and obtained or captured by an eye tracking device as described above. Paths 400 and 404 shows the movements of the users' eyes across the various regions of page 402. The circles depicted in FIG. 4 represent fixation points. A fixation point marks a location in the scene where the saccadic eye movement stops for a brief period of time while viewing the scene. In some cases, a fixation point can be represented by, for example, a label or name identifying a region of interest of the page in which the fixation occurs. So for example, scanpath 400 depicted in FIG. 4 may be represented by the following sequence of region names {H, D, G, F, E, D, I, H, H, J, J, J}.

The scanpath data gathered by an eye tracker can be used by embodiments of the present invention to identify patterns within the path data. For example, a set of path data representing multiple scanpaths and can be analyzed to identify patterns, i.e., similar or matching portions therein. According to one embodiment, a dotplot can be generated that includes matches between region names in each scanpath of the path data. Hierarchical clustering can be performed based on the dotplot as described below with reference to FIG. 6.

Figure 5:
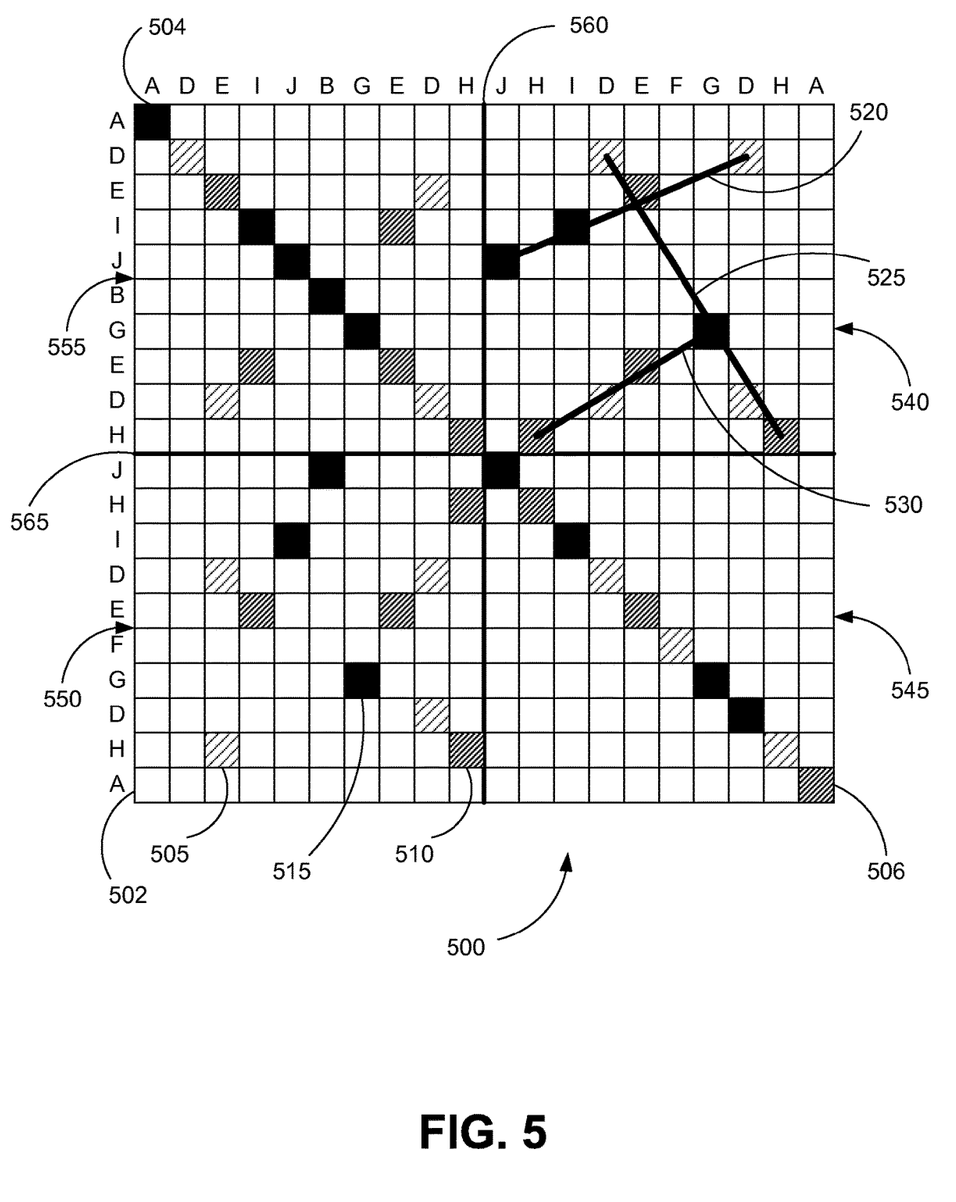
FIG. 5 is chart illustrating an exemplary dotplot for sequences of data according to one embodiment of the present invention.

FIG. 5 is a chart illustrating an exemplary dotplot for sequences of data according to one embodiment of the present invention. Generally speaking, a dotplot 500 such as illustrated in this example is a graphical technique for visualizing similarities within a sequence of tokens or between two or more concatenated sequences of tokens. For example, in one embodiment sequences of tokens may be formed from scanpath data by substituting the name of a pre-defined region of interest on a stimulus image for each scanpath fixation on that image. Dotplot 500 can be created by listing one string or sequence, represented by and corresponding to the sequence of region of interest names, on the horizontal axis 504 and on the vertical axis 502 of a matrix. Such a matrix is symmetric about a main upper-left to lower-right diagonal 506. Dots, e.g., 505, 510, and 515, can be placed in an intersecting cell of matching tokens. Additionally, these dots e.g., 505, 510, and 515, can be weighted to emphasize tokens that are more likely to be meaningful for particular applications. For example, and according to one embodiment, tokens can be inverse-frequency weighted to down-weight regions that are fixated extremely often or are otherwise trivial or uninteresting, making it easier to discover more significant eye movement patterns. This weighting can be shown on the dotplot 500 in color or shading and is illustrated in this example in dots with light hatching, e.g., 505, dots with heavy hatching, e.g., 510, and solid dots, e.g., 515. While three levels of weighting are illustrated here for the sake of clarity, it should be noted that embodiments of the present invention are not so limited. Similarly, it should be noted that the dotplot 500 illustrated in this example is significantly simplified for the sake of brevity and clarity but should not be considered as limiting on the type or extent of the dataset that can be handled by embodiments of the present invention. Rather, it should be understood that datasets for various implementations and embodiments and the corresponding dotplots can be extensive. Weighting can be applied based on different considerations. For example, when a large dataset, i.e., a large number of scanpaths, is analyzed resulting in a very large or complex dotplot, various tokens, i.e., fixation points, can be weighted based on their relative importance or interest.

As noted above, each token of the sequence of tokens represented in the dotplot 500 can correspond to an individual visual fixation that is part of a sequence of visual fixations within a region of interest on a stimulus image. In such cases and as illustrated here, each token can comprise a region name identifying one of a plurality of regions of interest of the stimulus image in which the corresponding visual fixation is located. However, it should be understood that, in other embodiments, other identifiers can be used. For example, fixation duration, time between fixations, distance between fixations (a.k.a. saccade length), angles between fixations, etc. It should be understood that, while tokens comprising or representing region names may be useful when graphing or displaying results, these other types of tokens can be equally useful, even if not used for graphing or displaying results, and are also considered to be within the scope of the present invention.

The dotplot 500 can be used to identify matches and reverse matches between sequences of data points or tokens. Such sequences are represented in the dotplot 500 in this example by lines 520, 525, and 530 through the dots of the particular sequence. For example, line 520 represents the sequence of tokens "MED." Similarly, line 525 represents the sequence "DEGDH" and line 530 represents the sequence "HDEG." According to one embodiment, these sequences can be identified based on line fitting processes such as various linear regression processes including but not limited to a process such as described below with reference to FIG. 9.

Stated another way, strings comprising tokens corresponding to the region of interest in which a fixation point is detected can be concatenated and cross-plotted in a dotplot 500, placing a dot in matching rows and columns as illustrated in FIG. 5. The dotplot 500 can contain both self-matching scanpath sub-matrices along the diagonal and cross-matching scanpath sub-matrices off the main diagonal. For example and as illustrated here, the dotplot can include sub-matrices 540, 545, 550, and 555 in four quadrants of the dotplot 500 and separated here for illustrative purposes by bold vertical and horizontal lines 560 and 565. It should be understood that this example has a single distinct cross-matching sub-matrix 540 because its input consists of just two sequences. In general, if a dotplot's input consists of N sequences, there will be N*(N−1)/2 distinct cross-matching sub-matrices. Each cross-matching sub-matrix contains dots or points that correspond to the tokens that match between two scanpaths. Note that although each cross-matching sub-matrix appears twice, both in the upper right and again, transposed, in the lower left, each cross-matching sub-matrix need be examined only once to find matches between all pairs of scanpaths as described below and in FIG. 9.

Matching sequences can be found, for example, by attempting to fit linear regression lines through filled cells. For example, the isolated sub-matrix 540 illustrated in FIG. 5 shows that three patterns were located: (1) line 525 "DEGDH", a matching pattern relationship from fixating the regions of interest (D) Primary Tabs, (E) Subtabs, (G) Table Left, (D) Primary Tabs, then (H) Table Center of the stimulus image of FIG. 4; (2) line 530 "HDEG", a reverse match from moving between the regions of interest (H) Table Center, (D) Primary Tabs, (E) Subtabs, and (G) Table Left; and (3) line 520 "JIED", a second reverse match moving vertically along the right side of the page, i.e., (J) Table Footer (I) Table Right (E) Subtabs and (D) Primary Tabs of the stimulus image of FIG. 4.

It should be understood that such a dotplot 500 can be used to represent any variety of different types of data. For example, the data can represent protein, DNA, and RNA sequences and the dotplot 500 can be used to identify insertions, deletions, matches, and reverse matches in the data. In another example, the data can represent text sequences and the dotplot can be used to identify the matching sequences in literature, detect plagiarism, align translated documents, identify copied computer source code, etc. According to one embodiment, the dataset can represent eye tracking data, i.e., data obtained from a system for tracking the movements of a human eye. In such cases, tokens can represent fixation points, e.g., on particular regions of interest on a user interface, and the sequences can represent scanpaths or movements of the eye between the regions.

Regardless of exactly what type dataset is used, embodiments described herein can include hierarchically clustering sequential data by analyzing the sequences plotted on the dotplot to identify pair-wise matches therein and clustering together sequences that have the longest sequential matches. According to one embodiment, identifying such matches can be based on a line fitting technique, including but not limited to, a regression process performed on the dotplot. For example, the regression process can include, but is not limited to a least-squares regression. Therefore, hierarchical sequential clustering can comprise repeatedly identifying the two closest clusters from the dotplot and merging the two closest clusters into a single cluster until only one cluster remains.

Figure 6:
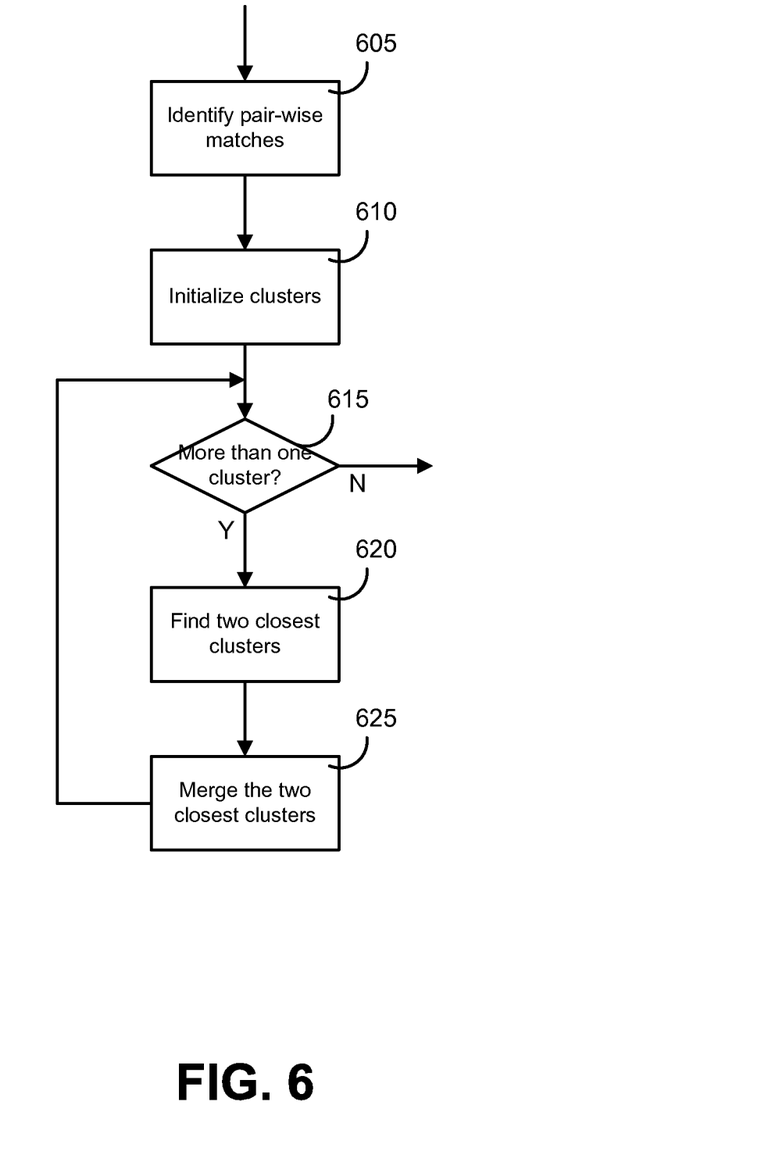
FIG. 6 is a flowchart illustrating a process for hierarchical sequential clustering according to one embodiment of the present invention.

FIG. 6 is a flowchart illustrating a process for hierarchical sequential clustering according to one embodiment of the present invention. In this example, the process begins with identifying 605 pair-wise sequential matches between the plurality of sequences within the sequential data. A number of clusters can be initialized 610. For example, initializing 610 the number of clusters can comprise initializing the number of clusters to one cluster per sequence in the sequential data.

A determination 615 can be made as to whether more than one cluster exists within the data. If 615 more than one cluster exists, the two closest clusters can be identified 620. According to one embodiment, identifying 620 two closest clusters can be based on a line fitting technique applied to a dotplot. For example, dotplots may be constructed from each of the sequences associated with each of the clusters and a line fitting technique can comprise a regression technique such as a least-square regression. Once matches are determined, they may be ranked by their "length", i.e. their total number of matching tokens. Sequences with "longer" matches may be considered "closer", and the clusters with sequences that have the longest matches may be considered the closest.

Once identified 620, two closest clusters can be merged 625 into a single cluster. Merging the two closest clusters can comprise assigning a unique identifier to the merged cluster, copying the closest distance and matching sequence offset to the merged cluster, and assigning a cluster sequence to the merged cluster. The cluster sequence can be the child sequence that matches the most other sequences in the dotplot dataset.

Once the two closest clusters are merged 625, processing can return to determining 615 whether more than one cluster exists. If 615 more than one cluster remains, identifying 620 the two closest clusters and merging 625 the two closest clusters into a single cluster can be repeated until a single cluster remains. At this point clustering can end and processing can pass to, for example, displaying or reporting results of the clustering or other processes.

Stated another way, hierarchical sequential clustering can comprise creating a dotplot of all sequences in a dataset and initializing clusters to one per sequence. While there is more than one cluster, the two closest clusters can be found. The closest clusters can be determined by choosing two arbitrary clusters, computing the distance between them and then looping through other pairs of clusters to see if any other pair has a closer distance. The actual distance between two clusters may be calculated with a "distance" function. Because distances between clusters must be calculated repeatedly, an obvious optimization would be to store pre-computed distances in a cache. Such a cache could be implemented by creating a unique key for each pair of clusters by concatenating the two cluster ids. Pseudo code for one possible distance function may be:

```
function getDistance (referenceToClusterI, referenceToClusterJ) {
    make a key from both cluster IDs
    use the key to get distance between i and j from cache
    if(the distance is in the cache){
        return the distance;
    }
    otherwise{
        distance = computeDistance(cluster1id, cluster2id);
        store the distance in the cache;
        return the distance;
    }
}
function computeDistance(cluster1id, cluster2id){
    look through dotplot matches array for any match between cluster1id and cluster2id
        ignore palindromes (matches with positive slope)
        if(there is no match)
            return (distance:0.01, patternOffset: −1};
        return {distance:matchLength / maxMatchLength, patternOffset: offsetInDotplotMatchesArray};
```

The two closest clusters can be merged. The merged cluster can be given a unique identifier. The merged cluster can copy the closest distance between the two child clusters and a patternOffset (a reference to the sequential match in the dotplot matches array). The merged cluster may also be assigned a sequence, which can be the child sequence that matches the most other sequences in the dotplot dataset.

According to one embodiment, after a sequential dataset has been clustered, an "aggregate sequence" may optionally be assigned to each cluster that best represents the entire set of sequences in the cluster. Aggregate sequences may be useful for helping people understand what the sequences in the cluster have in common. If the sequential dataset is a set of eye tracking scanpaths, for example, after the scanpaths have been sequentially clustered, an aggregate sequence for each cluster may be thought of as an "aggregate scanpath" and may be interpreted as a representation of the visual search strategy that is common to each of the scanpaths in the cluster. According to one embodiment, creating an aggregate sequence from a cluster can comprise determining if the cluster has a reference to a match in the dotplot's array of matches. If so, a scanpath can be generated from the sequence of region names in the matching sequence. Otherwise, the sequence of the cluster's child cluster that has the greatest distance can be used. Since aggregate sequences determined in this manner are also pair-wise matches, they take no extra time to compute and they accurately reflect actual sequential matches in the input data. They can be thought of as matches between the "strongest" leaf sequences of each sub-cluster.

For further illustration, the following pseudocode for a hierarchical sequential clustering process is provided:

```
/*
    generic hierarchical sequential clustering using dotplot-identified matches
    @author Jonathan Helfman, Oracle July 2009
*/
function cluster (dotplot, dataSequences) {
    width = the total number of sequences
    maxMatchLength = the length of longest pair-wise match in the dotplot matches array;
    clusters = [ ];          // starts as an empty array
    distances = { };         // cache of distances starts out empty
    // initialize cluster array from dataSequences
    for(each sequence){
        store a new object in the clusters array with properties for
        1) a reference to the sequence   2) a unique cluster ID
        3) an initial zero distance
    }
    while(the number of clusters in the clusters array is greater than 1){
        // the first pair of clusters start out as the closest
        clusterI = 0;
        clusterJ = 1;
        closest = getDistance(clusterI, clusterJ);
        // try to find a closer pair of clusters by looping through every other cluster pair
        for(i = 0; i < clusters.length; i++){
            for(var j = i + 1; j < clusters.length; j++){
                rc = getDistance(i, j);
                if(rc.distance > closest.distance){ // closest distance is largest or closest to one
                    closest = rc;
                    clusterI = i;
                    clusterJ = j;
                }
            }
        }
        // now clusterI and clusterJ are offsets of the two closest clusters
        // find out how many other sequences match clusterI and clusterJ
        matchCountI = dotplot.getMatchCount(clusterI);
        matchCountJ = dotplot.getMatchCount(clusterJ);
        //  merge clusters with the largest/closest distance value
        store a new object in the clusters array to represent the new merged cluster with properties
for
        1) a reference to the child sequence with the largest matchCount
        2) a new cluster ID
        3) the distance between clusterI and clusterJ
        4) a reference to the matching sequence in the dotplot matches array (if any)
        5) a reference to the 'right' cluster, the child cluster with the smallest distance
```

```
        6) a reference to the 'left' cluster, the child cluster with the greatest distance
    remove the child clusters from the clusters array
            add the new merged cluster to the clusters array
    }
}
```

However, it should be understood that this pseudocode is provided by way of example only and is not intended to limit embodiments of the invention to any particular implementation.

In summary, this approach uses the original dotplot analysis for comparisons, e.g., the "closest" distance calculations can be determined by the original pair-wise matches in the dotplot. Therefore, no new dotplot calculations are required and clustering can't drift away from the original matches. Also, associating a sequence with a new merged cluster from the original sequences increases the likelihood of finding matches higher in cluster tree. If instead, merged cluster sequences were actual matches, merged cluster sequences would get shorter with each merge, making deep clusters less likely.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for hierarchically clustering sequential data that preserves sequential information in the data, the method comprising:

generating, by a dotplot generator of a path analysis system, a dotplot representing the sequential data comprising a plurality of sequences;

identifying pair-wise sequential matches between the plurality of sequences within the sequential data based on the dotplot;

initializing a number of clusters represented by the plurality of sequences;

identifying a pair of sequences of the plurality of sequences that are closest to each other according to a distance measure based on the dotplot, wherein the identified pair of sequences comprises sequences having a longest sequential match;

merging the identified pair of sequences into a single cluster on the dotplot by creating an aggregate sequence and assigning the aggregate sequence to the single cluster, the aggregate sequence representing the identified pair of sequences as a single sequence on the dotplot, wherein merging the identified pair of sequences into a single cluster comprises:

(a) generating a new data object to be added to the dotplot matches array comprising a plurality of data objects having a same object type;

(b) determining a unique identifier for the single cluster, and storing the unique identifier within the new data object;

(c) determining a reference to one sequence of the identified pair of sequences, and storing the determined reference within the new data object;

(d) determining a closest distance between the identified pair of sequences to be merged into the single cluster;

(e) storing the determined closest distance between the identified pair of sequences within the new data object;

(f) storing the new data object as a new entry within the dotplot matches array;

(g) associating the identified pair of sequences to the new data object stored within the dotplot matches array, and (h) removing the identified pair of sequences from the dotplot; and repeating identifying a pair of closest sequences of the plurality of sequences and merging the identified pair of sequences into a single cluster until a single cluster remains on the dotplot.

2. The method of claim 1, wherein the distance measure is a measure of a length of the longest sequential match as determined by a total count of sequentially-matching tokens.

3. The method of claim 1, wherein the distance measure is a measure of a sum of weights of sequentially-matching tokens.

4. The method of claim 1, wherein initializing the number of clusters comprises initializing the number of clusters to one cluster per sequence in the sequential data.

5. The method of claim 1, wherein identifying the closest pair of sequences of the plurality of sequences is based on a line fitting technique to determine if points are collinear.

6. The method of claim 5, wherein the line fitting technique comprises a regression technique.

7. The method of claim 1, wherein the sequential data comprises eye tracking data.

8. The method of claim 7, wherein the sequential data further comprises scanpaths including fixation points.

9. The method of claim 1, wherein creating the aggregate sequence comprises determining whether at least one sequence of the identified pair of sequences is referenced by any data object within the dotplot matches array.

10. The method of claim 9, further comprising, in response to determining at least one sequence of the identified pair of sequences is referenced by a first data object within the dotplot matches array, creating the aggregate sequence from the first data object within the dotplot matches array referencing the at least one sequence of the identified pair of sequences.

11. The method of claim 10, further comprising, in response to determining the identified pair of sequences is not referenced by any data object within the dotplot matches array, creating the aggregate sequence from a child cluster of the single cluster.

12. A system comprising:
a processor; and
a memory communicatively coupled with and readable by the processor and having stored therein a series of instructions which, when executed by the processor, cause the processor to hierarchically cluster sequential data by:
  generating, by a dotplot generator of the system, a dotplot representing the sequential data comprising a plurality of sequences,
  identifying pair-wise sequential matches between the plurality of sequences within the sequential data based on the dotplot,
  initializing a number of clusters represented by the plurality of sequences, identifying a pair of sequences of the plurality of sequences that are closest to each other according to a distance measure based on the dotplot, wherein the identified pair of sequences comprises sequences having a longest sequential match,
  merging the identified pair of sequences into a single cluster on the dotplot by creating an aggregate sequence and assigning the aggregate sequence to the single cluster, the aggregate sequence representing the identified pair of sequences as a single sequence on the dotplot, wherein merging the identified pair of sequences into a single cluster comprises:
    (a) generating a new data object to be added to the dotplot matches array comprising a plurality of data objects having a same object type;
    (b) determining a unique identifier for the single cluster, and storing the unique identifier within the new data object;
    (c) determining a reference to one sequence of the identified pair of sequences, and storing the determined reference within the new data object;
    (d) determining a closest distance between the identified pair of sequences to be merged into the single cluster;
    (e) storing the determined closest distance between the identified pair of sequences within the new data object;
    (f) storing the new data object as a new entry within the dotplot matches array;
    (g) associating the identified pair of sequences to the new data object stored within the dotplot matches array, and
    (h) removing the identified pair of sequences from the dotplot; and
  repeating identifying a pair of closest sequences of the plurality of sequences and merging the identified pair of sequences into a single cluster until a single cluster remains on the dotplot.

13. The system of claim 12, wherein creating the aggregate sequence comprises determining whether at least one sequence of the identified pair of sequences is referenced by any data object within the dotplot matches array.

14. The system of claim 13, the memory storing further instructions which, when executed by the processor, cause the processor to, in response to determining at least one sequence of the identified pair of sequences is referenced by a first data object within the dotplot matches array, create the aggregate sequence from the first data object within the dotplot matches array referencing the at least one sequence of the identified pair of sequences.

15. The system of claim 14, the memory storing further instructions which, when executed by the processor, cause the processor to, in response to determining the identified pair of sequences is not referenced by any data object within the dotplot matches array, create the aggregate sequence from a child cluster of the single cluster.

16. A non-transitory machine-readable medium having stored therein a series of instructions which, when executed by a processor, cause the processor to hierarchically cluster sequential data by:
  generating, by a dotplot generator of a path analysis system, a dotplot representing sequential data comprising a plurality of sequences;
  identifying pair-wise sequential matches between the plurality of sequences within the sequential data based on the dotplot;
  initializing a number of clusters represented by the plurality of sequences;
  identifying a pair of sequences of the plurality of sequences that are closest to each other according to a distance measure based on the dotplot, wherein the identified pair of sequences comprises sequences having a longest sequential match;
  merging the identified pair of sequences into a single cluster on the dotplot by creating an aggregate sequence and assigning the aggregate sequence to the single cluster, the aggregate sequence representing the identified pair of sequences as a single sequence on the dotplot, wherein merging the identified pair of sequences into a single cluster comprises:
    (a) generating a new data object to be added to the dotplot matches array comprising a plurality of data objects having a same object type;
    (b) determining a unique identifier for the single cluster, and storing the unique identifier within the new data object;
    (c) determining a reference to one sequence of the identified pair of sequences, and storing the determined reference within the new data object;
    (d) determining a closest distance between the identified pair of sequences to be merged into the single cluster;
    (e) storing the determined closest distance between the identified pair of sequences within the new data object;
    (f) storing the new data object as a new entry within the dotplot matches array;
    (g) associating the identified pair of sequences to the new data object stored within the dotplot matches array, and
    (h) removing the identified pair of sequences from the dotplot; and
  repeating identifying a pair of closest sequences of the plurality of sequences, merging the identified pair of sequences into a single cluster, and assigning the aggregate sequence to the single cluster until a single cluster remains on the dotplot.

17. The machine-readable medium of claim 16, wherein initializing the number of clusters comprises initializing the number of clusters to one cluster per sequence in the sequential data.

18. The machine-readable medium of claim 16, wherein identifying the closest pair of sequences of the plurality of sequences is based on a technique to determine if points are collinear.

* * * * *

UNITED STATES PATENT AND TRADEMARK OFFICE
CERTIFICATE OF CORRECTION

PATENT NO. : 10,552,710 B2
APPLICATION NO. : 12/831615
DATED : February 4, 2020
INVENTOR(S) : Helfman et al.

Page 1 of 1

It is certified that error appears in the above-identified patent and that said Letters Patent is hereby corrected as shown below:

On the Title Page

On page 2, Column 1, under Other Publications, Line 11, delete "WebMaps witheye" and insert -- Web Maps with eye --, therefor.

On page 3, Column 1, under Other Publications, Line 38, delete "Research Tracking" and insert -- Tracking Research --, therefor.

On page 3, Column 2, under Other Publications, Line 40, delete "Offtce" and insert -- Office --, therefor.

In the Specification

In Column 6, Line 59, delete "10 g," and insert -- 10g, --, therefor.

In Column 11, Line 15, delete ""MED."" and insert -- "JIED." --, therefor.

In Column 13, Line 23, delete "(distance" and insert -- {distance --, therefor.

Signed and Sealed this
Tenth Day of November, 2020

Andrei Iancu
*Director of the United States Patent and Trademark Office*